(12) United States Patent
King et al.

(10) Patent No.: US 9,914,365 B2
(45) Date of Patent: Mar. 13, 2018

(54) APPARATUS AND METHOD FOR RAPID CHARGING USING SHARED POWER ELECTRONICS

(71) Applicant: General Electric Company, Schenectady, NY (US)

(72) Inventors: Robert Dean King, Schenectady, NY (US); Robert Louis Steigerwald, Burnt Hills, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 15/265,404

(22) Filed: Sep. 14, 2016

(65) Prior Publication Data

US 2017/0001528 A1   Jan. 5, 2017

Related U.S. Application Data

(63) Continuation of application No. 14/219,201, filed on Mar. 19, 2014, which is a continuation of application
(Continued)

(51) Int. Cl.
*H02J 7/00* (2006.01)
*B60L 11/18* (2006.01)
(Continued)

(52) U.S. Cl.
CPC ............ *B60L 11/185* (2013.01); *B60L 7/12* (2013.01); *B60L 7/14* (2013.01); *B60L 9/22* (2013.01);
(Continued)

(58) Field of Classification Search
USPC ........................................................ 320/111
See application file for complete search history.

(56) References Cited

U.S. PATENT DOCUMENTS

| 5,373,195 A | 12/1994 | De Doncker et al. |
| 5,589,743 A | 12/1996 | King |

(Continued)

FOREIGN PATENT DOCUMENTS

| JP | 2000-299136 A | 10/2000 |
| JP | 2007-252118 A | 9/2007 |

(Continued)

OTHER PUBLICATIONS

Unofficial English Translation of Office Action issued in connection with corresponding JP Application No. 2010-278693 dated Jul. 9, 2014.
(Continued)

*Primary Examiner* — Robert Grant
(74) *Attorney, Agent, or Firm* — Meagher Emanuel Laks Goldberg & Liao, LLP

(57) ABSTRACT

An apparatus comprises a power electronic energy conversion system comprising a first energy storage device configured to store DC energy and a first voltage converter configured to convert a second voltage from a remote power supply into a first charging voltage configured to charge the first energy storage device. The apparatus also includes a first controller configured to control the first voltage converter to convert the second voltage into the first charging voltage and to provide the first charging voltage to the first energy storage device during a charging mode of operation and communicate with a second controller located remotely from the power electronic energy conversion system to cause a second charging voltage to be provided to the first energy storage device during the charging mode of operation to rapidly charge the first energy storage device.

16 Claims, 10 Drawing Sheets

Related U.S. Application Data

No. 12/641,359, filed on Dec. 18, 2009, now Pat. No. 8,698,451.

(51) Int. Cl.

| | | |
|---|---|---|
| *B60L 7/12* | (2006.01) | |
| *B60L 7/14* | (2006.01) | |
| *B60L 9/22* | (2006.01) | |
| *B60L 9/28* | (2006.01) | |
| *B60L 11/00* | (2006.01) | |
| *B60L 11/16* | (2006.01) | |

(52) U.S. Cl.
CPC .............. *B60L 9/28* (2013.01); *B60L 11/005* (2013.01); *B60L 11/16* (2013.01); *B60L 11/1803* (2013.01); *B60L 11/1805* (2013.01); *B60L 11/1811* (2013.01); *B60L 11/1816* (2013.01); *B60L 11/1857* (2013.01); *B60L 11/1868* (2013.01); *B60L 11/1887* (2013.01); *H02J 7/0013* (2013.01); *H02J 7/0027* (2013.01); *H02J 7/0045* (2013.01); B60L 2200/36 (2013.01); B60L 2210/14 (2013.01); B60L 2210/30 (2013.01); B60L 2210/40 (2013.01); B60L 2240/72 (2013.01); Y02T 10/7022 (2013.01); Y02T 10/7066 (2013.01); Y02T 10/7072 (2013.01); Y02T 10/7225 (2013.01); Y02T 10/7241 (2013.01); Y02T 10/7291 (2013.01); Y02T 90/121 (2013.01); Y02T 90/127 (2013.01); Y02T 90/128 (2013.01); Y02T 90/14 (2013.01); Y02T 90/16 (2013.01); Y02T 90/163 (2013.01); Y02T 90/168 (2013.01); Y02T 90/34 (2013.01); Y04S 30/12 (2013.01); Y10S 903/903 (2013.01); Y10T 307/50 (2015.04); Y10T 307/505 (2015.04)

(56) References Cited

U.S. PATENT DOCUMENTS

| | | |
|---|---|---|
| 5,903,449 A | 5/1999 | Garrigan et al. |
| 6,331,365 B1 | 12/2001 | King |
| 6,608,396 B2 | 8/2003 | Downer et al. |
| 6,737,822 B2 | 5/2004 | King |
| 6,917,180 B2 | 7/2005 | Harrison et al. |
| 7,049,792 B2 | 5/2006 | King |
| 7,256,516 B2 | 8/2007 | Buchanan et al. |
| 8,143,856 B2 | 3/2012 | Andrea et al. |
| 8,265,816 B1 | 9/2012 | LaFrance |
| 2003/0209375 A1 | 11/2003 | Suzuki et al. |
| 2004/0062059 A1* | 4/2004 | Cheng ................ B60L 11/1814 363/17 |
| 2008/0203966 A1* | 8/2008 | Ward ........................ H02J 7/35 320/104 |
| 2008/0218104 A1 | 9/2008 | Lukic et al. |
| 2009/0096410 A1* | 4/2009 | Sakurai ............... B60L 11/1803 320/104 |
| 2009/0103341 A1 | 4/2009 | Lee et al. |
| 2009/0115375 A1 | 5/2009 | Lida |
| 2009/0177595 A1 | 7/2009 | Dunlap et al. |
| 2009/0210357 A1 | 8/2009 | Pudar et al. |
| 2009/0309537 A1 | 12/2009 | Saito |
| 2010/0013438 A1 | 1/2010 | Anwar et al. |
| 2010/0017249 A1 | 1/2010 | Fincham et al. |
| 2010/0060016 A1 | 3/2010 | Hunter |
| 2010/0079105 A1 | 4/2010 | Iwanaga et al. |
| 2010/0141205 A1 | 6/2010 | Tyler et al. |
| 2010/0318250 A1 | 12/2010 | Mitsutani |
| 2012/0049792 A1 | 3/2012 | Crombez |

FOREIGN PATENT DOCUMENTS

| | | |
|---|---|---|
| JP | 2008-199780 A | 8/2008 |
| JP | 2009183086 A | 8/2009 |
| JP | 2007247090 A | 10/2009 |
| WO | 9632768 A1 | 10/1996 |
| WO | 9708803 A1 | 3/1997 |

OTHER PUBLICATIONS

Toyota Prius, "Plug-in Hybrid Gasoline-Electric Hybrid Synergy Drive", Hybrid Vehicle Dismantling Manual, 74 pages.
Hybrid/Battery Control: Plug-In Charge Control System: Details; 2012 My Prius PHV [Jan. 2012- ] https://techinfo.toyota.com/t3Portal/resources/jsp/siviewer/index.jsp?dir=ncf/NM19G0U&href=xtml/RM000005417000X.html&locale=en&model=Prius%20PH, pp. 1-9.
Hybrid/Battery Control: Hybrid Control System: Details (2010 Prius PHV), Sep. 23, 2011, https://techinfo.toyota.com/t3Portal/resources/jsp/siviewer/index.jsp?dir=ncf/NM14C0U&href=xtml/RM000004273004X.html&locale=en&model=Prius%20PH, pp. 1-65.

* cited by examiner

APPARATUS AND METHOD FOR RAPID CHARGING USING SHARED POWER ELECTRONICS

CROSS-REFERENCE TO RELATED APPLICATION

The present application is a continuation of U.S. patent application Ser. No. 14/219,201, filed Mar. 19, 2014, which is a continuation of, and claims priority to, U.S. patent application Ser. No. 12/641,359, filed Dec. 18, 2009, now U.S. Pat. No. 8,698,451, issued Apr. 15, 2014, the disclosures of which are incorporated herein by reference.

BACKGROUND OF THE INVENTION

Embodiments of the invention relate generally to electric drive systems including hybrid and electric vehicles and, more particularly, to rapidly charging one electric drive system using shared power electronics of one or more additional electric drive systems.

Hybrid electric vehicles may combine an internal combustion engine and an electric motor powered by an energy storage device, such as a traction battery, to propel the vehicle. Such a combination may increase overall fuel efficiency by enabling the combustion engine and the electric motor to each operate in respective ranges of increased efficiency. Electric motors, for example, may be efficient at accelerating from a standing start, while combustion engines may be efficient during sustained periods of constant engine operation, such as in highway driving. Having an electric motor to boost initial acceleration allows combustion engines in hybrid vehicles to be smaller and more fuel efficient.

Purely electric vehicles use stored electrical energy to power an electric motor, which propels the vehicle and may also operate auxiliary drives. Purely electric vehicles may use one or more sources of stored electrical energy. For example, a first source of stored electrical energy may be used to provide longer-lasting energy while a second source of stored electrical energy may be used to provide higher-power energy for, for example, acceleration.

Plug-in electric vehicles, whether of the hybrid electric type or of the purely electric type, are configured to use electrical energy from an external source to recharge the traction battery. Such vehicles may include on-road and off-road vehicles, golf cars, neighborhood electric vehicles, forklifts, and utility trucks as examples. These vehicles may use either off-board stationary battery chargers, on-board battery chargers, or a combination of off-board stationary battery chargers and on-board battery chargers to transfer electrical energy from a utility grid or renewable energy source to the vehicle's on-board traction battery. Plug-in vehicles may include circuitry and connections to facilitate the recharging of the traction battery from the utility grid or other external source, for example. The battery charging circuitry, however, may include dedicated components such as boost converters, high-frequency filters, choppers, inductors, and other electrical components dedicated only to transferring energy between the on-board electrical storage device and the external source. These additional dedicated components add extra cost and weight to the vehicle.

In addition, the total current available for recharging the on-board electrical storage device using only the on-board battery charging circuitry of the vehicle is limited to the total current that the on-board battery charging circuitry can supply. The on-board electrical storage device, however, may be designed to accept a charging current much greater than the total current supplied by the on-board battery charging circuitry. Increasing the total current supplied by the on-board battery charging circuitry typically includes increasing the size and capacity of the circuitry components, which adds yet additional cost and weight to the vehicle.

It would therefore be desirable to provide an apparatus to facilitate the transfer of electrical energy from multiple external sources to the on-board electrical storage device of a plug-in vehicle that reduces the number of components dedicated only to transferring energy between the on-board electrical storage device and the external source and that increases the total current available for charging the on-board electrical storage device.

BRIEF DESCRIPTION OF THE INVENTION

According to one aspect of the invention, an apparatus comprises a power electronic energy conversion system comprising a first energy storage device configured to store DC energy and a first voltage converter configured to convert a stored voltage from the first energy storage device into a first voltage configured to drive an electromechanical device. The first voltage converter is also configured to convert a second voltage from a remote power supply into a first charging voltage configured to charge the first energy storage device. The apparatus also includes a first controller configured to control the first voltage converter to convert the second voltage into the first charging voltage and to provide the first charging voltage to the first energy storage device during a charging mode of operation and communicate with a second controller located remotely from the power electronic energy conversion system to cause a second charging voltage to be provided to the first energy storage device during the charging mode of operation to rapidly charge the first energy storage device.

In accordance with another aspect of the invention, a method comprises coupling a first energy storage device to a first voltage converter, wherein the first energy storage device is configured to store electrical energy and wherein the first voltage converter is configured to convert a stored voltage from the first energy storage device into a first voltage configured to drive a motor and to convert a second voltage from a first remote power supply into a first charging voltage configured to charge the first energy storage device. The method also comprises coupling a first controller to the first voltage converter and configuring the first controller to cause the first voltage converter to convert the second voltage into the first charging voltage and to provide the first charging voltage to the first energy storage device during a rapid charging mode of operation. The method further comprises configuring the first controller to cause a second charging voltage from a second remote power supply to be provided to the first energy storage device during the rapid charging mode of operation to rapidly charge the first energy storage device.

In accordance with yet another aspect of the invention, a system comprises a first power bus, a second power bus, and a first vehicle. The first vehicle comprises a first energy storage device configured to store DC energy, a first motor and a first voltage converter configured to convert a stored voltage from the first energy storage device into a motoring voltage configured to drive the first motor and to convert a first voltage from the first power bus into a first charging voltage configured to charge the first energy storage device. The first vehicle also comprises a first controller configured to control the first voltage converter to convert the first voltage into the first charging voltage and to provide the first charging voltage to the first energy storage device. The system also comprises a first energy conversion system located remotely from the first vehicle and comprising a second voltage converter configured to convert the first voltage from the first power bus into a second charging voltage configured to charge the first energy storage device of the first vehicle. The first energy conversion system further comprises a second controller configured to control the second voltage converter to convert the first voltage into the second charging voltage and to provide the second charging voltage to the second power bus and communicate with the first controller to cause the second charging voltage to be provided from the second power bus to the first energy storage device to rapidly charge the first energy storage device.

Various other features and advantages will be made apparent from the following detailed description and the drawings.

BRIEF DESCRIPTION OF THE DRAWINGS

The drawings illustrate embodiments presently contemplated for carrying out the invention.

In the drawings.

DETAILED DESCRIPTION

Figure 1:
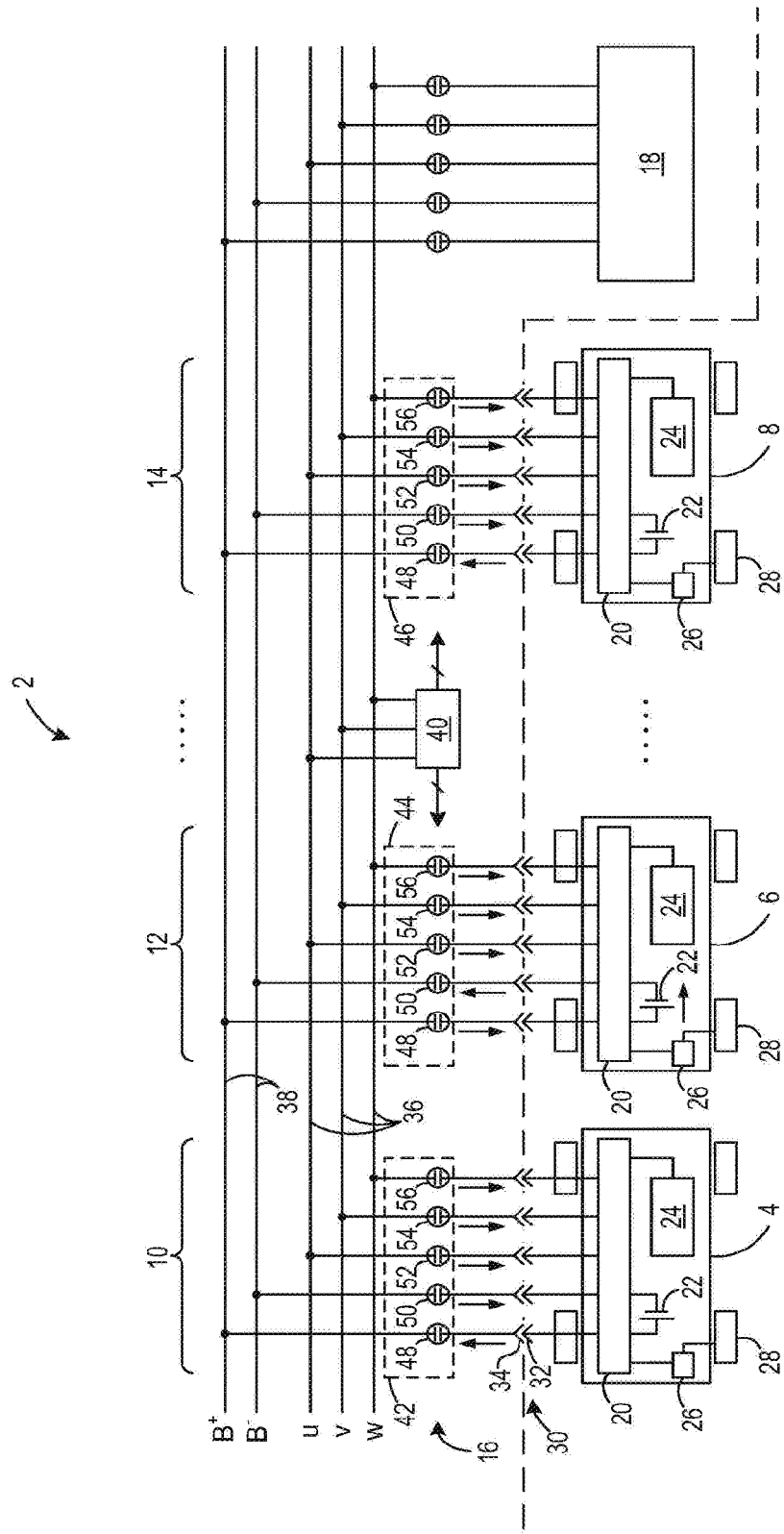
FIG. 1 is a schematic block diagram of a charging system according to an embodiment of the invention.

FIG. 1 is a schematic block diagram of the infrastructure of a charging system 2 according to an embodiment of the invention. Charging system 2 illustrates a plurality of vehicles 4, 6, 8 coupled to a respective charging bay or socket 10, 12, 14 of a charging station 16. Charging system 2 may include, in one embodiment, a non-vehicle charging unit 18 as described below with respect to FIGS. 7-9. According to embodiments of the invention, vehicles 4-8 and charging station 16 are configured to cooperate together to share power electronics among the vehicles 4-8 and optional off-board charging unit 18 to provide a charging current to one of the vehicles, such as vehicle 6, to augment and increase the charging current generated by the vehicle alone.

Each vehicle 4-8 includes a plurality of power electronics 20 coupled to a least one energy storage device 22. During operation of vehicle 4-8, a controller 24 causes a DC voltage from energy storage device 22 to be modified and delivered to an electromechanical device or motor 26 mechanically coupled to one or more driving wheels or axles 28 during a motoring mode of operation. In another embodiment, the DC voltage from energy storage device 22 may be modified and delivered to another load (not shown) such as air conditioning compressors, fans, pumps, or other auxiliary drives.

Vehicles 4-8 may include AC motors 26, and controller 24 is configured to cause a DC voltage from energy storage device 22 to be inverted to an AC voltage via power electronics 20 for delivery to motor 26. In this embodiment, vehicles 4-8 may be on-road and off-road vehicles or utility trucks, for example. In another embodiment, vehicles 4-8 may include DC motors 26, and controller 24 is configured to cause a DC voltage from energy storage device 22 to be converted to a variable DC voltage via power electronics 20 for delivery to motor 26 during a motoring mode of operation. In this embodiment, vehicles 4-8 may be fork lift trucks, golf cars, or neighborhood electric vehicles, for example.

When a vehicle 4-8 is parked or not in use, it may be desirable to plug the vehicle into, for example, the utility grid or to a renewable energy source to refresh or recharge energy storage device 22. Accordingly, vehicles 4-8 are coupleable to charging station 16 via a connection system 30 comprising mating contacts 32, 34. Charging station 16 includes a power bus 36 configured to supply or provide power to power electronics 20 of the vehicle 4-8. In one embodiment, power bus 36 is a 3-phase AC power bus such as the utility grid. It is contemplated, however, that power bus 36 may include any number of phases and may supply or receive AC or DC power.

According to embodiments of the invention, charging station 16 includes a shared DC voltage bus 38 configured to augment and increase the charging current generated by one of the vehicles coupled to charging station 16. Charging station 16 also includes a controller 40 coupled to a plurality of contactor groups 42, 44, 46 for each charging bay 10, 12, 14 available at charging station 16. In one embodiment, each contactor group 42-46 has a pair of contactors 48, 50 coupled to shared DC voltage bus 38 and a plurality of contactors 52, 54, 56 coupled to power bus 36. Controller 40 is configured to control contactors 48-56 and to communicate with each vehicle controller 24 to direct and control charging of the vehicles coupled to charging station 16. In one embodiment, controller 40 is configured to communicate with each vehicle controller 24 via power line communications over power bus 36. However, other modes of communication, such as wireless communication or communication via a dedicated communication line, are also contemplated herein.

As illustrated in FIG. 1, vehicles 4-8 are coupled to charging station 16. According to the embodiment shown, vehicles 4 and 8 are using their power electronics 20 to provide power from power bus 36 to shared DC voltage bus 38 such that the charging power provided to the energy storage device 22 of vehicle 6 may augmented. That is, while vehicle 6 draws power from power bus 36 for conversion into a charging power provided to its energy storage device 22, the additional charging power provided and controlled by vehicles 4 and 8 is also provided to the energy storage device 22 via shared DC voltage bus 38, and the energy storage device 22 of vehicle 6 may accordingly be rapidly charged.

In one embodiment, the cost to a vehicle owner for plugging into charging station 16 and drawing charging power therefrom may vary per unit charge according to a level of charging mode desired. For example, charging station 16 may be configured to allow selection of a rapid/sharing charging mode, a non-rapid/non-sharing charging mode, and a non-rapid/sharing charging mode.

In the rapid/sharing charging mode, the vehicle is connected to charging station 16 and awaits its turn to rapidly charge its energy storage device 22. In this mode, the respective contactors 48, 50 are closed such that the vehicle's charging bus may be coupled to shared DC voltage bus 38. While the vehicle is awaiting its turn for rapid charging and after its turn has been completed, its power electronics 20 are shared with other vehicles coupled to charging station 16 via the respective contactors 48, 50 to charge another vehicle currently allowed to rapidly charge its energy storage device 22.

In the non-rapid/non-sharing charging mode, the vehicle is connected to charging station 16 and begins to charge its energy storage device 22 only from the power electronics 20 on-board the vehicle without connection of its energy storage device 22 to the shared DC voltage bus 38. That is, in this charging mode, the respective contactors 48, 50 remain open, and the vehicle's energy storage device 22 is charged solely via the vehicle's on-board power electronics 20.

In the non-rapid/sharing charging mode, the vehicle is connected to charging station 16, and the respective contactors 48, 50 are closed such that the vehicle's charging bus may be coupled to shared DC voltage bus 38. In this charging mode, the vehicle participates in power electronics sharing while another vehicle is rapidly charging its energy storage device 22. The vehicle, however, is disconnected from shared DC voltage bus 38 if no other vehicle is in a rapid charging mode, and the vehicle's power electronics 20 are used to charge the vehicle's energy storage device 22 solely via the vehicle's on-board power electronics 20. When another vehicle later enters a rapid charging mode, the vehicle again participates in power electronics sharing during this time.

According to one embodiment, the rapid/sharing charging mode may result in the highest cost per charging unit for a vehicle owner/operator, and the non-rapid/sharing charging mode may result in the least cost per charging unit for a vehicle owner/operator. As such, the vehicle owner/operator may be charged at a premium rate, for example, for the ability to rapidly charge the vehicle's energy storage device 22 in the rapid/sharing charging mode, while the vehicle owner/operator may be charged at a reduced rate, for example, for sharing the vehicle's power electronics 20 in the non-rapid/sharing charging mode. For the non-rapid/non-sharing charging mode, the vehicle owner/operator may be charged at a rate, for example, between the premium rate and the reduced rate. The decision of which charging mode to select may be made by the vehicle owner/operator based on the need of the energy storage device 22 to receive a rapid charge and the comparative costs between the charging modes.

Figure 2:
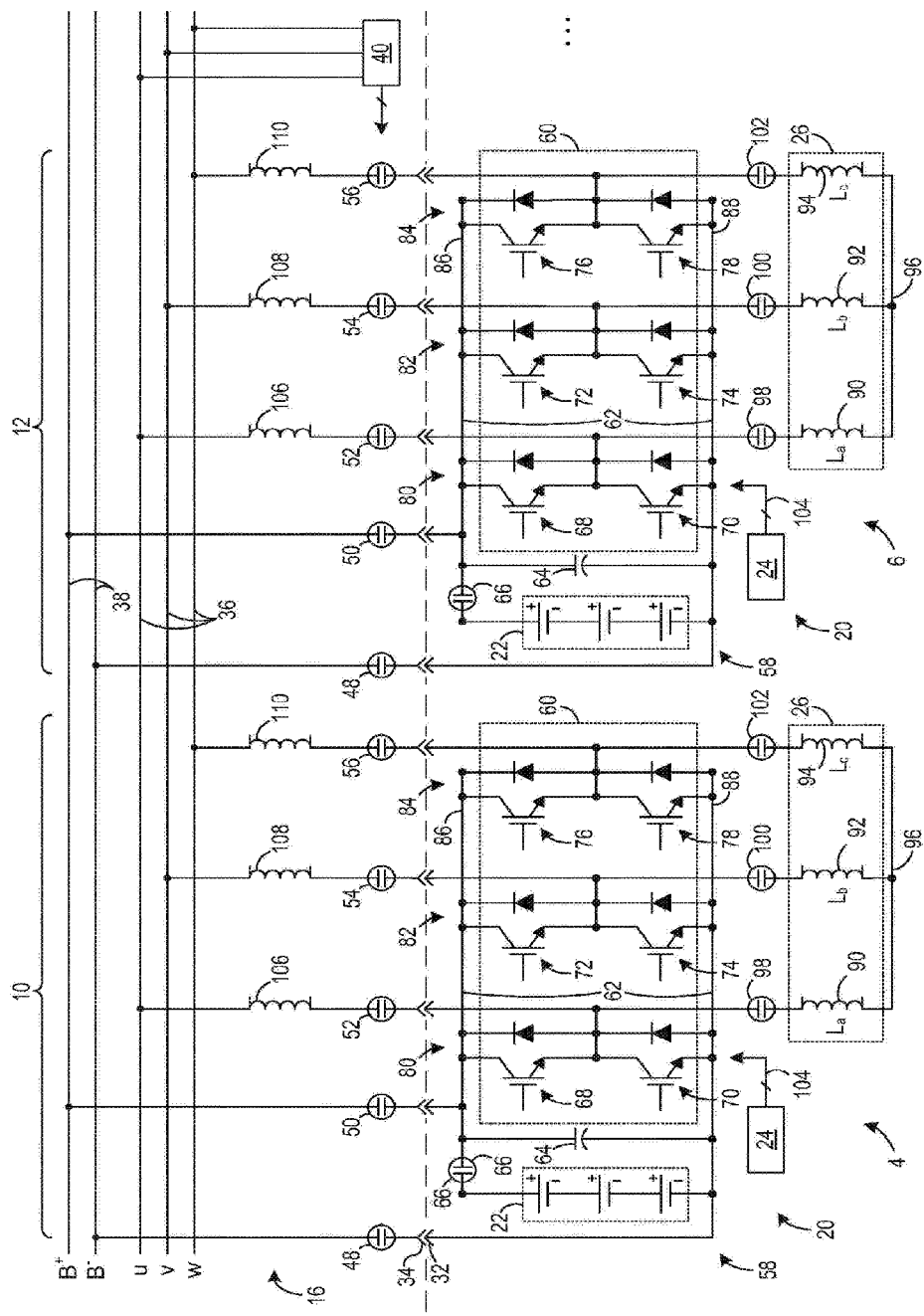
FIG. 2 is a schematic diagram of a portion of the charging system of FIG. 1 according to an embodiment of the invention.

FIG. 2 is a schematic diagram of a portion of the charging system 2 of FIG. 1 according to an embodiment of the invention. FIG. 2 shows exemplary schematics for each vehicle 4, 6. Each vehicle 4, 6 includes a traction system 58 that includes energy storage device 22 and power electronics 20. Power electronics 20 include a bi-directional DC-to-AC voltage inverter 60 coupled to energy storage device 22 via a DC bus 62. In one embodiment, energy storage device 22 is a high-voltage energy storage device and may be a battery, a flywheel system, fuel cell, an ultracapacitor, or the like. A DC link filter capacitor 64 is coupled across DC bus 62 to filter high-frequency currents on DC bus 62. A contactor 66 coupled to DC bus 62 allows energy storage device 22 to be decoupled from DC bus 62. Bi-directional DC-to-AC voltage inverter 60 is a voltage converter and includes six half phase modules 68, 70, 72, 74, 76, and 78 that are paired to form three phases 80, 82, and 84. Each phase 80, 82, 84 is coupled to a pair of conductors 86, 88 of DC bus 62.

Motor 26 is coupled to bi-directional DC-to-AC voltage inverter 60. In one embodiment, motor 26 is a traction motor mechanically coupled to one or more driving wheels or axles 28 (shown in FIG. 1) or other electrical apparatus including cranes, elevators, or lifts. Electromechanical device 26 includes a plurality of windings 90, 92, and 94 coupled to respective phases 80, 82, 84 of bi-directional DC-to-AC voltage inverter 60. Windings 90-94 are also coupled together to form a node 96. During the charging of energy storage device 22 via charging station 16 and after receiving communication and confirmation of charging mode from controller 40, controller 24 causes a plurality of contactors 98, 100, 102 to respectively decouple windings 90-94 from bi-directional DC-to-AC voltage inverter 60 such that motor 26 remains unpowered.

Controller 24 is coupled to half phase modules 68-78 via a plurality of lines 104. During use of vehicle 4, 6 in a non-charging mode, controller 24 applies appropriate control of half phase modules 68-78 and controls bi-directional DC-to-AC voltage inverter 60 to convert a DC voltage or current on DC bus 62 to an AC voltage or current for supply to windings 90-94. Accordingly, the DC voltage or current from energy storage device 22 may be converted into an AC voltage or current and delivered to motor 26 to drive wheels 28. In other non-vehicle propulsion systems, the drive wheels 28 may be another type of load (not shown), including a pump, fan, winch, crane, elevator, or other motor driven loads. In a regenerative braking mode, electromechanical device 26 may be operated as a generator to brake wheels 28 or, for non-vehicle propulsion systems, other types of loads and to provide AC voltage or current to bi-directional DC-to-AC voltage inverter 60 for inversion into a DC voltage or current onto DC bus 62 that is suitable for recharging energy storage device 22.

Contactors 48, 50 are in the open state prior to coupling vehicles 4, 6 to charging station 16. Depending on the communication medium between controller 40 and the controllers 24 of vehicles 4, 6, contactors 52-56 may be in the open or closed state. For example, if controller 40 and the controllers 24 of vehicles 4, 6 are configured to communicate over the power line, contactors 52-56 may be in the closed state to allow such communications when a vehicle 4, 6 is coupled to charging station 16. However, if controller 40 and the controllers 24 of vehicles 4, 6 are configured to communicate via a different communication mode, contactors 52-56 may be in the open state. Contactors 98-102 are put into the open state prior to closing contactors 52-56 such that motor 26 remains unpowered during connection to charging station 16 as described above.

When a vehicle, such as vehicle 6, is plugged into or coupled to charging station 16, controller 40 establishes communication with the controller 24 of vehicle 6 to determine the desired charging mode and other parameters. The other parameters may include, for example, whether the DC nominal voltage of energy storage device 22 is within a given threshold and within minimum and maximum voltage limits of the charging station 16. If the desired charging mode includes sharing power electronics and another vehicle is in the rapid charging mode, controller 40 closes contactors 48, 50 and communicates with controller 24 of vehicle 6 that its power electronics 20 should convert power from power bus 36 for providing power to shared DC voltage bus 38. If the desired charging mode includes rapidly charging the energy storage device 22 of vehicle 6, controller 40 communicates with controller 24 of vehicle 6 when it is possible to close contactor 66 to begin the rapid charging of the energy storage device 22 of vehicle 6.

The other parameters may also include a status of the energy storage device 22 currently being charged. For example, the controller 24 of vehicle 6 may be configured to monitor energy storage device 22 using known algorithms to prevent overcharge, etc. In another embodiment, the controller 24 of vehicle 6 may be configured to communicate commands through controller 40 to the controllers 24 of the other vehicles. These commands may be, for example, commands for the other vehicles to start ramping the current on shared DC voltage bus 38, to hold the current on shared DC voltage bus 38 at the present value, or to start lowering the current on shared DC voltage bus 38 by a delta amount.

Controller 24 is configured to control half phase modules 68-78 to boost the voltage of the power supplied thereto from power bus 36 such that charging power may be provided to energy storage device 22 or to shared DC voltage bus 38 that is a voltage greater than that allowable through simple full-wave rectification of the power from power bus 36 without boosting. Respective pairs of half phase modules 68-70, 72-74, 76-78, together with a plurality of respective inductors 106, 108, 110, form individual boost converters that operate to boost the current and/or voltage of the power supplied thereto from power bus 36. In one embodiment, inductors 106-110 are high frequency inductor components located in charging station 16 and are off board of vehicles 4, 6. In another embodiment, inductors 106-110 represent a leakage inductance of the line transformer of power bus 36.

When one or more vehicles, such as vehicle 6 and/or vehicle 8, is used to share its power electronics 20 with the power electronics 20 of vehicle 6 for the rapid charging of the energy storage device 22 of vehicle 6, the bi-directional DC-to-AC voltage inverters 60 operate essentially in parallel.

After charging is complete or when a vehicle operator desires to unplug the vehicle from the charging station 16, controller 40 establishes handshaking communication with the controller 24 of the vehicle, such as vehicle 6, to confirm that the vehicle is in a non-charging mode and that the vehicle is disconnected from charging station 16. In one embodiment, for example, contacts 32, 34 of connection system 30 may be disengaged only after contactors 48-56 of the respective charging bay 10-14 have been opened and after the contacts 32, 34 have been unlocked. An indicator (not shown) on the vehicle, the connection system 30, or the charging station 16 may indicate a locked/unlocked status of the connection system 30.

Figure 3:
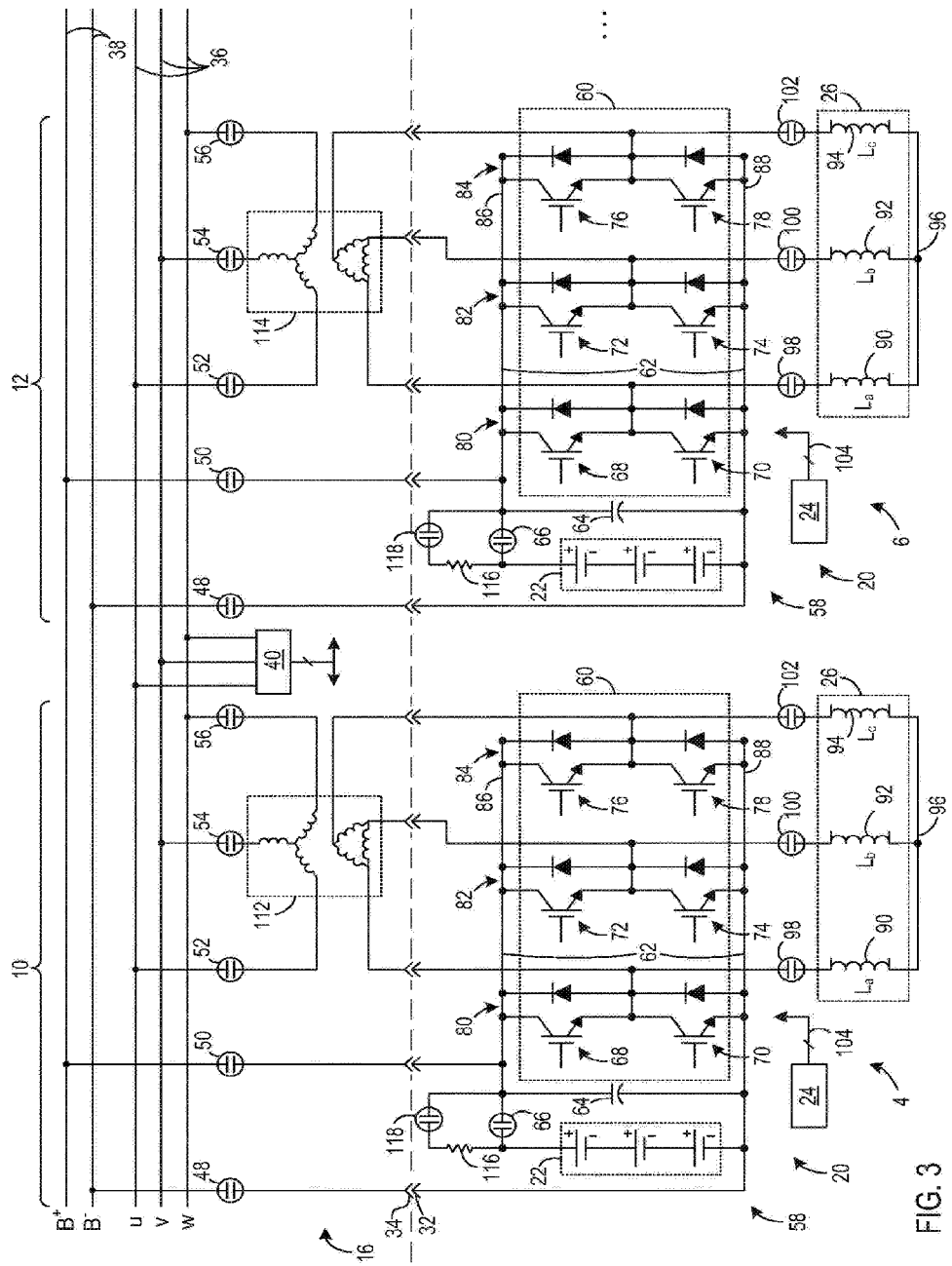
FIG. 3 is a schematic diagram of the charging system shown in FIG. 2 according to another embodiment of the invention.

FIG. 3 is a schematic diagram of the charging system shown in FIG. 2 according to another embodiment of the invention. In addition to that shown with respect to FIG. 2, charging station 16 includes a multi-phase transformer 112, 114 for each charging bay 10, 12 available at charging station 16. Multi-phase transformers 112, 114 provide electrical isolation of the power electronics 20 from power bus 36. In addition, the outputs of the bi-directional DC-to-AC voltage inverters 60 via contactors 48, 50 operate in parallel while the inputs to the bi-directional DC-to-AC voltage inverters 60 via contactors 52-56 are removed from parallel operation. While wye-delta three-phase transformers are shown, it is contemplated that other arrangements (such as a zigzag winding arrangement) could be used to achieve alternative waveform phase shifting to reduce harmonic currents on the utility. Multi-phase transformers 112, 114 also allow selecting the most desired AC voltage for feeding the power electronics 20.

Vehicles 4, 6 also include a charge resistor 116 and a charge contactor 118. In an embodiment of the invention, charge contactor 118 may be closed to limit current flowing into energy storage device 22 when its voltage is below a predetermined threshold during an initial charge of energy storage device 22.

Figure 4:
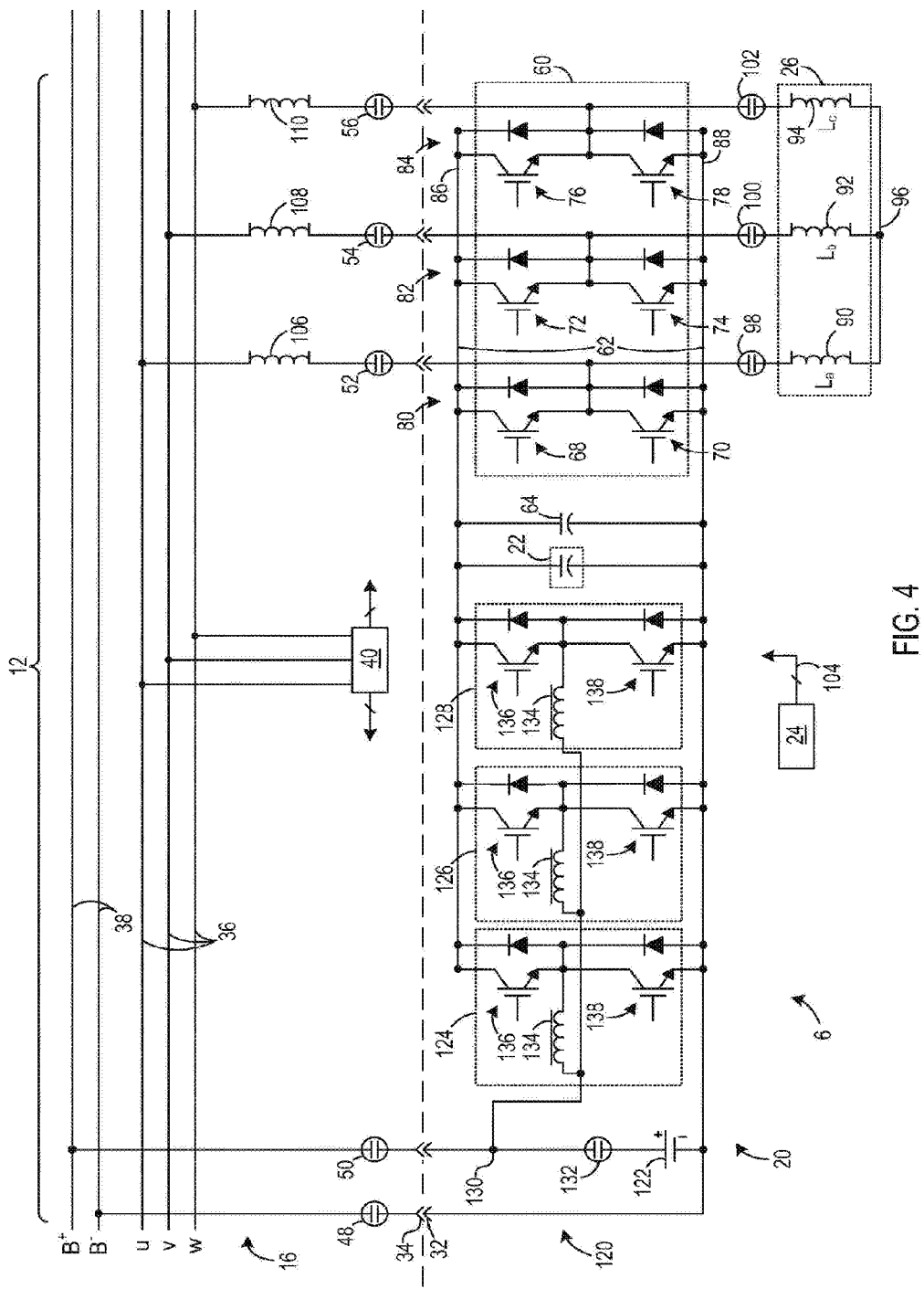
FIG. 4 is a schematic diagram of another a portion of the charging system of FIG. 1 according to an embodiment of the invention.

FIG. 4 shows a schematic diagram of a traction system 120 of vehicle 6 according to another embodiment of the invention. Elements and components common to traction systems 58 and 120 will be discussed relative to the same reference numbers as appropriate. In addition to the components common with traction system 58, traction system 120 includes a second energy storage device 122 coupled to DC bus 62 to provide power to bi-directional DC-to-AC voltage inverter 60 to drive motor 26 and wheels 28 (shown in FIG. 1). In one embodiment, second energy storage device 122 is a low-voltage energy storage device and may be a battery, a fuel cell, an ultracapacitor, or the like. First energy storage device 22 may be configured to provide a higher power than second energy storage device 122 to provide power during, for example, acceleration periods of the vehicle. Second energy storage device 122 may be configured to provide a higher energy than first energy storage device 22 to provide a longer-lasting power to the vehicle to increase a traveling distance thereof. As illustrated in FIG. 4, in one embodiment, first energy storage device 22 is an ultracapacitor.

A plurality of bi-directional DC-to-DC voltage converters 124, 126, 128 are configured to convert one DC voltage into another DC voltage. Bi-directional DC-to-DC voltage converter 124-128 are coupleable to second energy storage device 122 via a node 130 coupled to a contactor 132 and are coupled to DC bus 62. Each bi-directional DC-to-DC voltage converter 124-128 includes an inductor 134 coupled to a pair of half phase modules 136, 138. For illustrative purposes, half phase modules 136, 138 are shown to include insulated gate bipolar transistors (IGBTs). However, embodiments of the invention are not limited to IGBTs. Any appropriate electronic switch can be used, such as, for example, metal oxide semiconductor field effect transistors (MOSFETs), Silicon Carbide (SiC) MOSFETs, bipolar junction transistors (BJTs), and metal oxide semiconductor controlled thyristors (MCTs).

Controller 24 is coupled to bi-directional DC-to-DC voltage converters 124-128 via lines 104, and energy provided via second energy storage device 122 is boosted by control of bi-directional DC-to-DC voltage converters 124-128 to provide the higher voltage to DC bus 62. The energy provided via second energy storage device 122 to DC bus 62 is inverted via bi-directional DC-to-AC voltage inverter 60 and provided to motor electromechanical device 26. Similarly, energy generated during a regenerative braking mode may also be used to re-charge second energy storage device 122 via bi-directional DC-to-AC voltage inverter 60 and via bucking control of bi-directional DC-to-DC voltage converters 124-128.

As shown in FIG. 4, bi-directional DC-to-AC voltage inverter 60 of vehicle 6 is not coupled to second energy storage device 122 directly in parallel. Instead, as described above, power provided to DC bus 62 to charge second energy storage device 122 is controlled via bucking control of bi-directional DC-to-DC voltage converters 124-128. In an embodiment of the invention, the voltage capacity of second energy storage device 122 is lower than a rectified voltage of the voltage on power bus 36. Accordingly, bi-directional DC-to-AC voltage inverter 60 need not boost the voltage on power bus 36 but may be used to simply rectify the power bus voltage. That is, the switches in half phase modules 68-78 need not be switched or controlled via controller 24 in a charging operation of second energy storage device 122 using charging station 16. While bi-directional DC-to-AC voltage inverter 60 need not boost the voltage on power bus 36, it may nevertheless be controlled to do so. In addition, an isolation or multi-phase transformer, such as multi-phase transformer 112 shown in FIG. 3, may be used as described above with charging station 16 shown in FIG. 4. If switching control of half phase modules 68-78 is not used such that current from power bus 36 is not shaped via the switching control, harmonic currents may be reduced by employing various phase shifting arrangements of the isolation transformer to cancel harmonics.

To rapidly charge second energy storage device 122, controllers 24 and 40 can cooperate together to close contactors 48, 50 and contactor 132 of traction system 120 coupled to second energy storage device 122 such that the current from shared DC voltage bus 38 provided from other vehicles or from non-vehicle charging unit 18, for example, may be joined with charging current provided by bi-directional DC-to-DC voltage converters 124-128. Controllers 24 and 40 can also cooperate together to close contactors 48, 50 and to open contactor 132 such that vehicle 6 can share its power electronics 20 for rapid charging of the energy storage device of another vehicle coupled to charging station 16.

Figure 5:
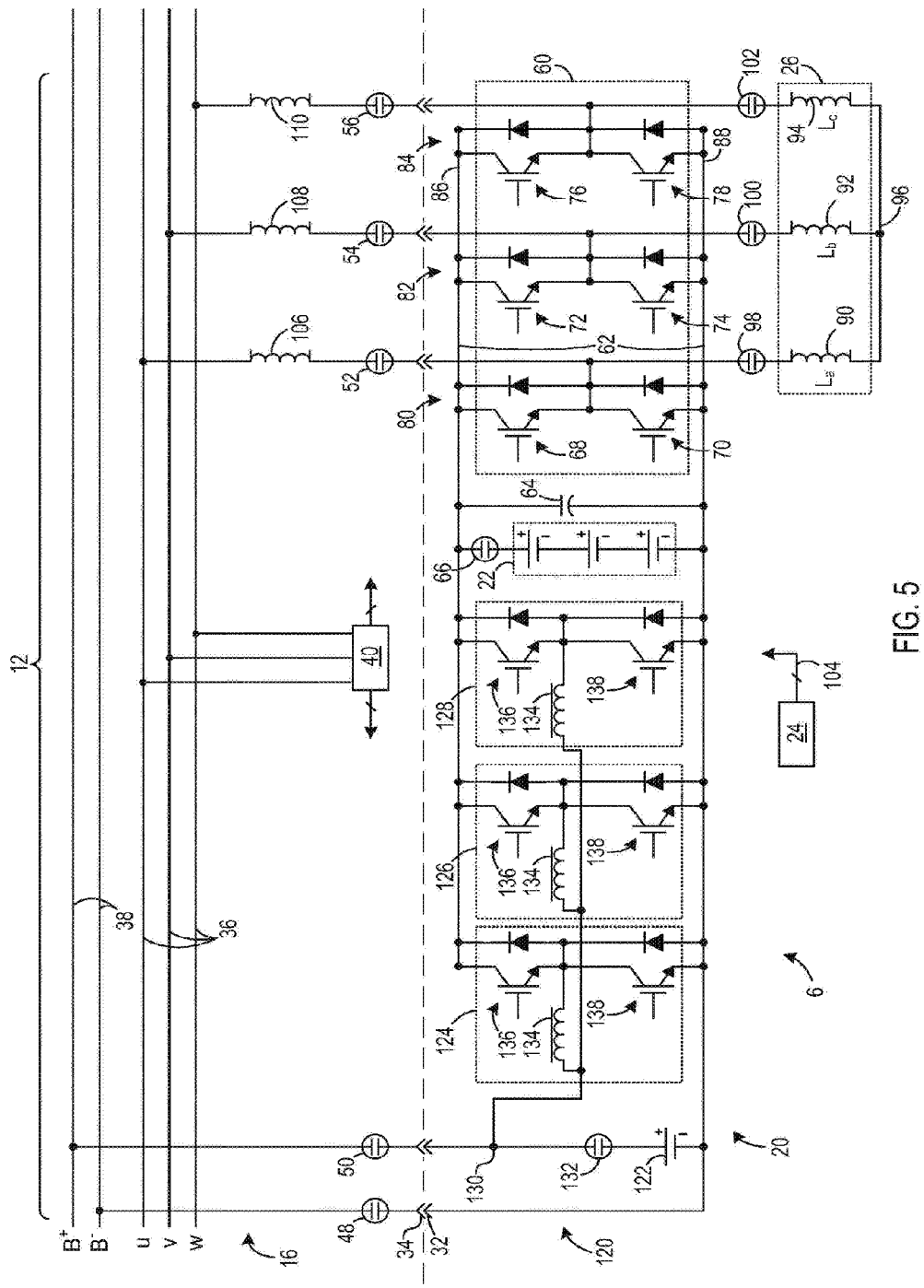
FIG. 5 is a schematic diagram of another a portion of the charging system of FIG. 1 according to an embodiment of the invention.

FIG. 5 shows a schematic diagram of traction system 120 of vehicle 6 according to another embodiment of the invention. As shown in FIG. 5, first energy storage device 22 is a high-voltage energy storage device such as a battery, a fuel cell, or the like as described above and has a voltage capacity higher than a rectified voltage of the voltage on power bus 36. Second energy storage device 122 may be configured, in an embodiment, to have a power limit that does not allow high power rapid charge as described above with respect to FIG. 4. In this embodiment, charging current supplied through shared DC voltage bus 38 to vehicle 6 is directed, via boost control of bi-directional DC-to-DC voltage converters 124-128, to DC bus 62 of vehicle 6 together with the charging current provided to DC bus 62 via boost control of phases 80-84 of bi-directional DC-to-AC voltage inverter 60. The charging current on DC bus 62 is directed to energy storage device 22 through contactor 66 to rapidly charge energy storage device 22. In this manner, six channels of the traction system 120 may be used to rapidly charge energy storage device 22. In one embodiment, charging of second energy storage device 122 may be accomplished by opening contactors 48, 50, closing contactor 132, and bucking charging current on DC bus 62 supplied thereto by either energy storage device 22 or by rectification of power from power bus 36.

Figure 6:
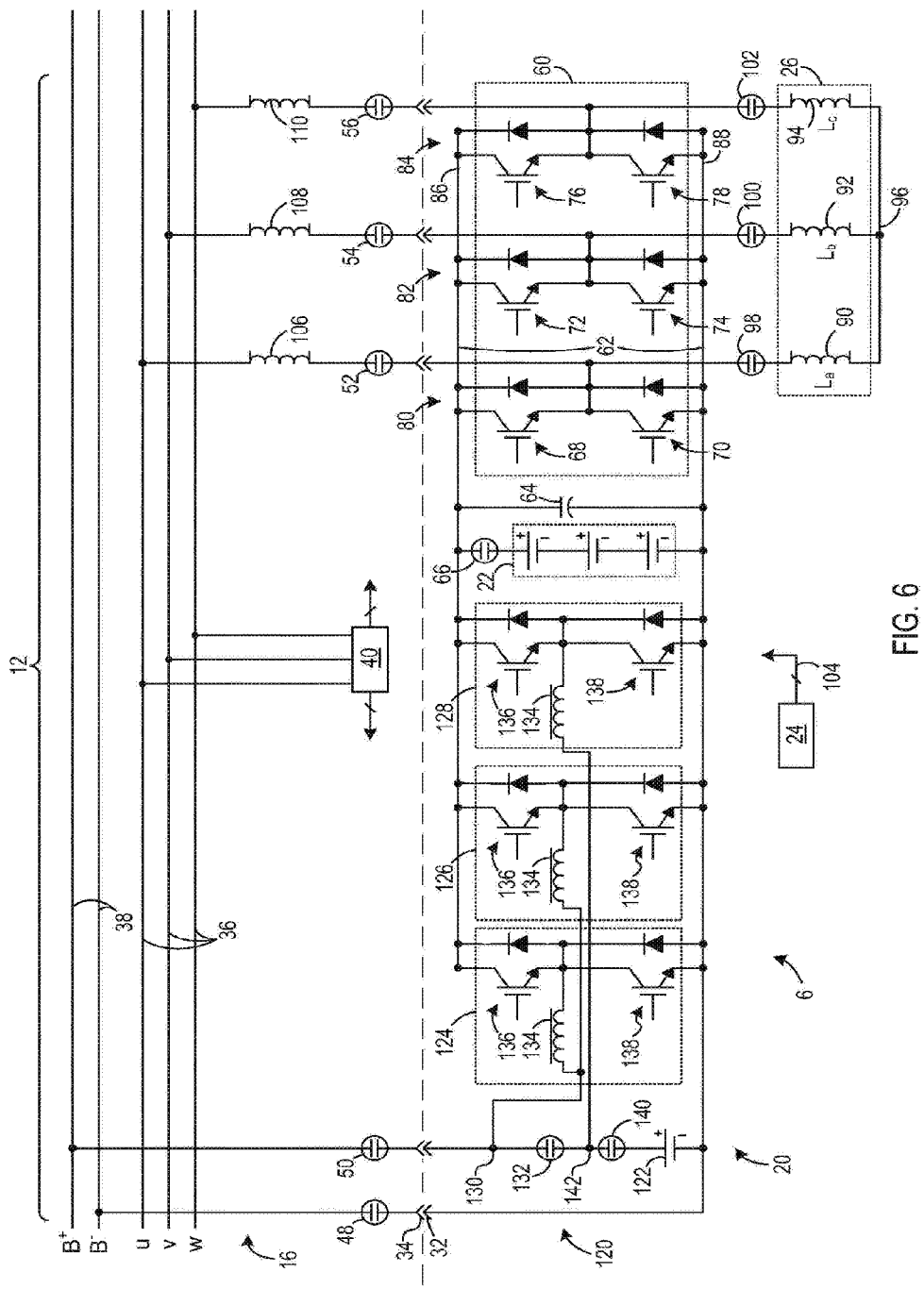
FIG. 6 is a schematic diagram of another a portion of the charging system of FIG. 1 according to an embodiment of the invention.

FIG. 6 shows a schematic diagram of traction system 120 of FIG. 5 according to another embodiment of the invention. A contactor 140 is coupled to a node 142 coupled between second energy storage device 122 and contactor 132. As shown, bi-directional DC-to-DC voltage converter 128 is coupled to node 142, while bi-directional DC-to-DC voltage converters 124, 126 remain coupled to node 130.

In this embodiment, it is possible to charge energy storage device 22 via six channels of traction system 120 as described above with respect to FIG. 5. That is, by opening contactor 140 and by closing contactor 132, bi-directional DC-to-DC voltage converters 124-128 and phases 80-84 of bi-directional DC-to-AC voltage inverter 60 may be controlled in a boosting mode to provide charging current to energy storage device 22 via DC bus 62 and contactor 66.

Alternatively, it is possible to charge energy storage device 22 via five channels of traction system 120 while simultaneously charging second energy storage device 122 via one channel of traction system 120. That is, controller 24 may open contactor 132 and cause bi-directional DC-to-DC voltage converters 124-126 and phases 80-84 of bi-directional DC-to-AC voltage inverter 60 in a boosting mode to provide charging current to DC bus 62. Controller 24 may then close contactor 66 to control rapid charging of energy storage device 22. In addition, controller 24 may also close contactor 140 and control bi-directional DC-to-DC voltage converter 128 in a bucking mode to charge second energy storage device 122.

Figure 7:
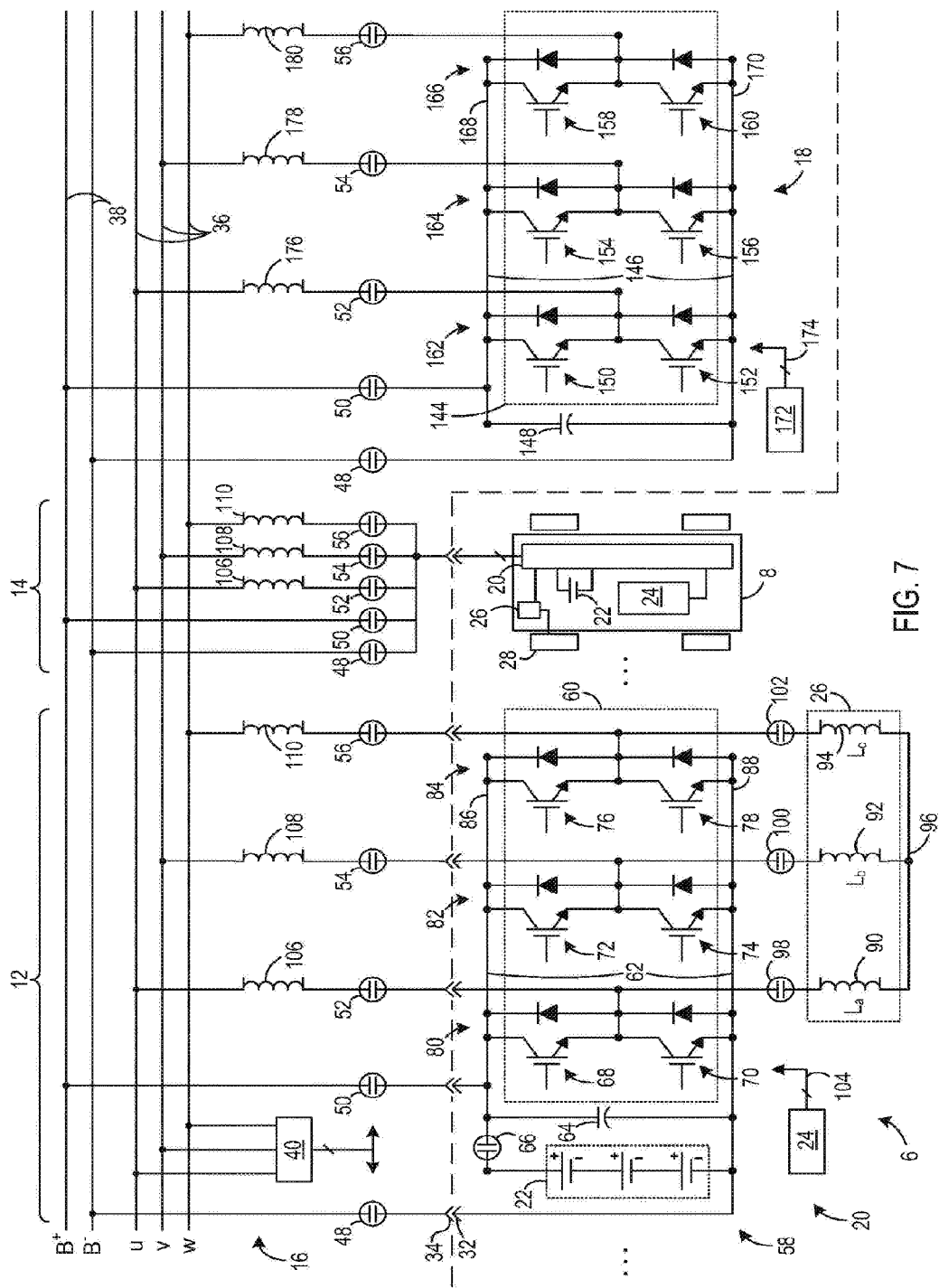
FIG. 7 is a schematic diagram of another a portion of the charging system of FIG. 1 according to an embodiment of the invention.

FIG. 7 is a schematic diagram of another portion of the charging system 2 of FIG. 1 according to an embodiment of the invention. FIG. 7 shows exemplary schematics for vehicle 6 and for non-vehicle charging unit 18. Charging unit 18 includes an AC-to-DC voltage inverter 144 coupleable to shared DC voltage bus 38 via a DC bus 146 and via contactors 48, 50. A DC link filter capacitor 148 is coupled across DC bus 146. AC-to-DC voltage inverter 144 includes six half phase modules 150, 152, 154, 156, 158, and 160 that are paired to form three phases 162, 164, and 166. Each phase 162, 164, 166 is coupled to a pair of conductors 168, 170 of DC bus 146. A controller 172 is coupled to half phase modules 150-160 via a plurality of lines 174 and controls respective pairs of half phase modules 150-152, 154-156, 158-160, together with a plurality of respective inductors 176, 178, 180, to boost the current and/or voltage of the power supplied thereto from power bus 36. In one embodiment, inductors 176-180 are high frequency inductor components located in charging system 16. In another embodiment, inductors 176-180 represent a leakage inductance of the line transformer of power bus 36.

Charging unit 18 may be included in charging system 2 to further increase the power available for rapid charging of a single vehicle. In addition, charging unit 18 allows the rapid charging of the energy storage device 22 of vehicle 6 at a higher power levels than are available from the on-board power electronics 20 of vehicle 6 even when no other vehicle is coupled to charging station 16 or when no other vehicle is configured to share its power electronics. Combining the on-board power electronics 20 of vehicle 6 with the power electronics of charging unit 18 allows rapid charging of the energy storage device 22 of vehicle 6 from a lower cost, lower power rated, off-board charger versus rapid charging via using exclusively off-board power electronics. For example, if the on-board power electronics 20 of vehicle 6 are rated at 99 kW and the off-board power electronics of charging unit 18 are rated at 100 kW, then 199 kW of rapid charge power may be provided to energy storage device 22 of vehicle 6. If two other vehicles, such as vehicles 4 and 8, are also coupled to charging station 16 and configured to share their power electronics 20 rated at 99 kW each, then 397 kW of rapid charge power may be provided to energy storage device 22 of vehicle 6. The power ratings specified in this example are merely exemplary, and other power ratings are contemplated. For example, charging unit 18 may be designed such that its power electronics are rated higher than 100 kW. The design of the power ratings of charging unit 18 may be based in part on the complexity and costs of the construction of charging system 2.

Figure 8:
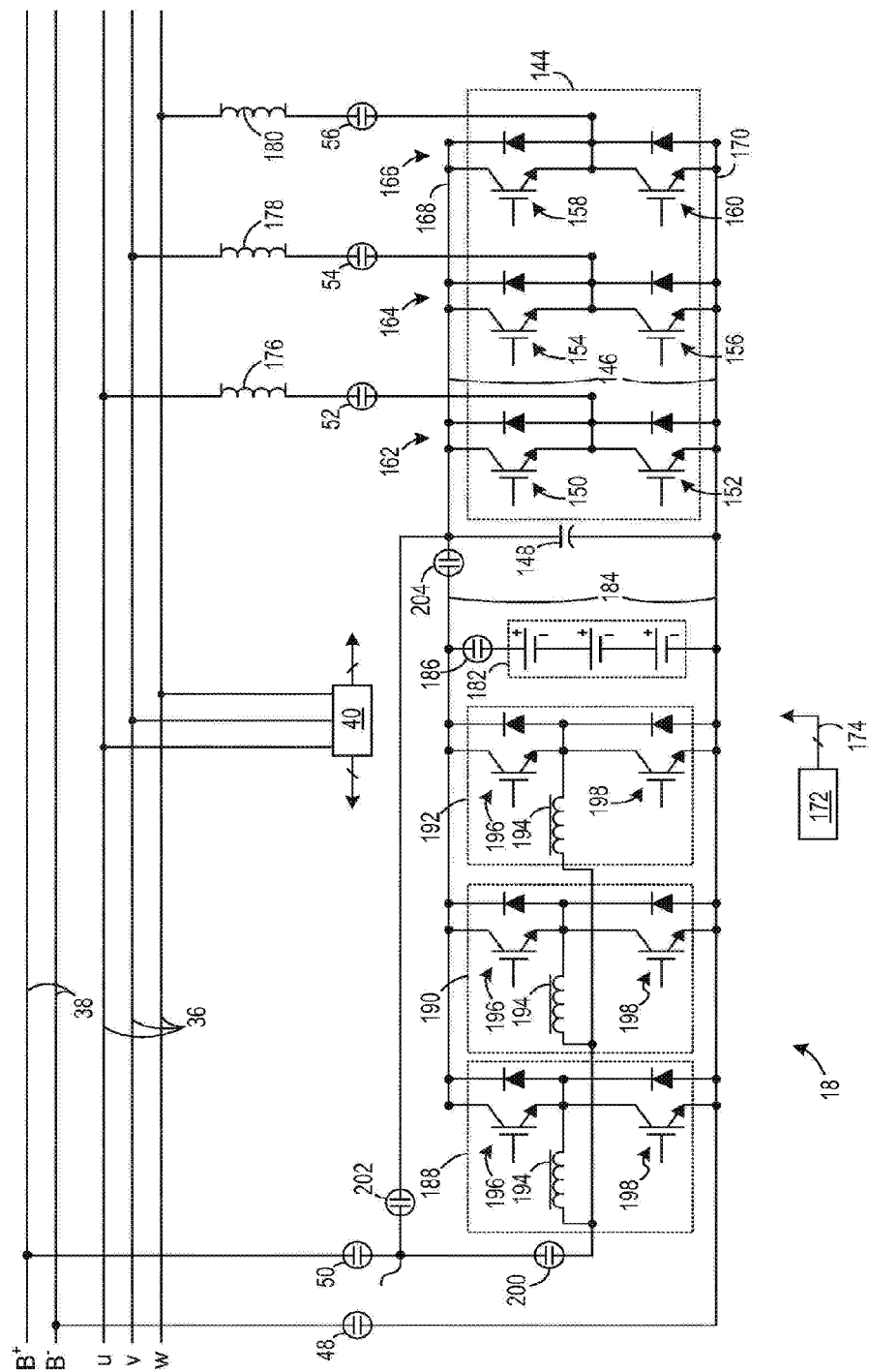
FIG. 8 is a schematic diagram of the charging unit of FIG. 7 according to an embodiment of the invention.

FIG. 8 is a schematic diagram of charging unit 18 of FIG. 7 according to another embodiment of the invention. Elements and components common to the charging units 18 shown in FIGS. 7 and 8 will be discussed relative to the same reference numbers as appropriate. In addition to the components common with charging unit 18 of FIG. 7, charging unit 18 of FIG. 8 includes an energy storage device 182 coupleable to a DC bus 184 via a contactor 186. Energy storage device 182 is configured to provide additional power to shared DC voltage bus 38. In one embodiment, energy storage device 182 is a high-voltage energy storage device and may be a battery, a flywheel system, fuel cell, an ultracapacitor, or the like.

A plurality of bi-directional DC-to-DC voltage converters 188, 190, 192 are configured to convert one DC voltage into another DC voltage. Bi-directional DC-to-DC voltage converter 188-192 are coupled to DC bus 184 and are coupleable to energy storage device 182 via contactor 186. Each bi-directional DC-to-DC voltage converter 188-192 includes an inductor 194 coupled to a pair of half phase modules 196, 198. For illustrative purposes, half phase modules 196, 198 are shown to include insulated gate bipolar transistors (IGBTs). However, embodiments of the invention are not limited to IGBTs. Any appropriate electronic switch can be used, such as, for example, metal oxide semiconductor field effect transistors (MOSFETs), Silicon Carbide (SiC) MOSFETs, bipolar junction transistors (BJTs), and metal oxide semiconductor controlled thyristors (MCTs). Bi-directional DC-to-DC voltage converter 188-192 are coupleable to contactor 50 via a contactor 200, and DC bus 146 is coupleable to contactor 50 via a contactor 202. A contactor 204 is configured to couple DC bus 146 to DC bus 184. In addition, controller 172 is coupled to bi-directional DC-to-DC voltage converters 188-192 via lines 174.

Energy storage device 182 allows the rapid charging of a vehicle energy storage device, such as energy storage device 22 of vehicle 6, at a higher power levels than are available from AC-to-DC voltage inverter 144 alone. During a vehicle charging operation using both AC-to-DC voltage inverter 144 and energy storage device 182, controller 172 causes contactor 204 to open and causes contactors 186, 200, and 202 to close. Controller 172 then controls respective pairs of half phase modules 150-152, 154-156, 158-160, together with inductors 176-180 to boost the current and/or voltage of the power supplied thereto from power bus 36 and to deliver the boosted current/voltage to shared DC voltage bus 38. In addition, controller 172 controls bi-directional DC-to-DC voltage converters 188-192 to buck a voltage from energy storage device 182 and to deliver the boosted current to shared DC voltage bus 38. DC bus 146 and DC bus 184 may be independently controlled to provide energy to shared DC voltage bus 38.

Energy storage device 182 may be charged by closing contactors 186, 204 and by opening contactors 200, 202. In this manner, controller 172 controls respective pairs of half phase modules 150-152, 154-156, 158-160, together with inductors 176-180 to boost the voltage of the power supplied thereto from power bus 36 and to deliver the boosted voltage to energy storage device 182. In an embodiment of the invention, the charging of energy storage device 182 may be performed during periods of low demand or low cost, for example, for the power on power bus 36. Energy storage device 182 may be used to augment the power provided to shared DC voltage bus 38 via AC-to-DC voltage inverter 144 during periods of high demand or high cost, for example, such as during high temperature days.

Figure 9:
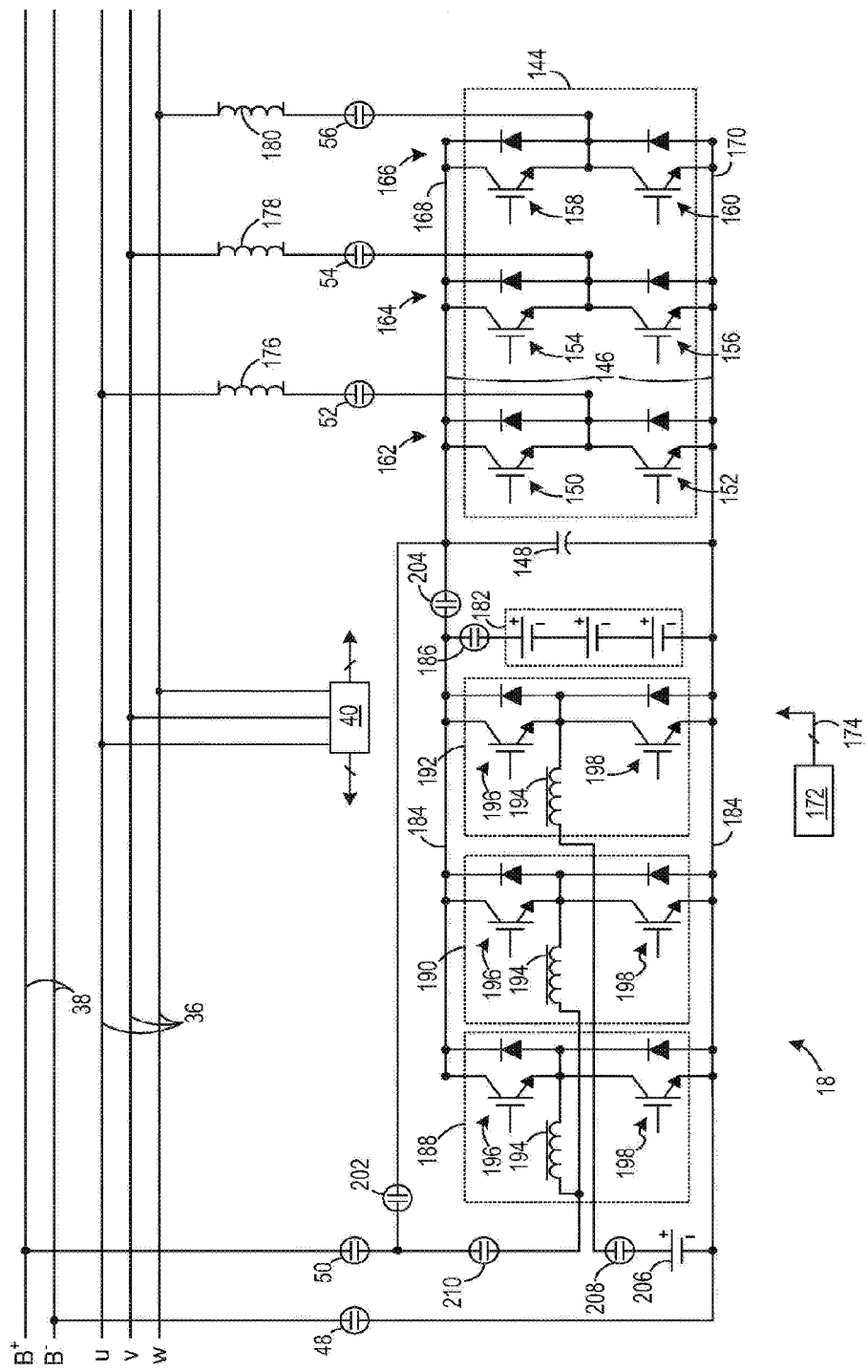
FIG. 9 is a schematic diagram of the charging unit of FIG. 7 according to an embodiment of the invention.

FIG. 9 is a schematic diagram of charging unit 18 of FIG. 8 according to another embodiment of the invention. Elements and components common to the charging units 18 shown in FIGS. 7-9 will be discussed relative to the same reference numbers as appropriate. In addition to the components common with charging unit 18 of FIGS. 7 and 8, charging unit 18 of FIG. 9 includes a second energy storage device 206 coupleable to bi-directional DC-to-DC voltage converter 192 via a contactor 208. In one embodiment, second energy storage device 206 is a low-voltage energy storage device and may be a battery, a fuel cell, an ultracapacitor, or the like. Energy storage device 182 may be configured to provide a higher power than second energy storage device 206. Second energy storage device 206 may be configured to provide a higher energy than energy storage device 182. Bi-directional DC-to-DC voltage converters 188, 190 are coupleable to contactor 50 via a contactor 210.

Second energy storage device 206 allows the rapid charging of a vehicle energy storage device, such as energy storage device 22 of vehicle 6, at a higher power levels than are available from AC-to-DC voltage inverter 144 and energy storage device 182. During a vehicle charging operation using AC-to-DC voltage inverter 144, energy storage device 182, and second energy storage device 206, controller 172 causes contactor 204 to open and causes contactors 186, 202, 208, and 210 to close. Controller 172 then controls respective pairs of half phase modules 150-152, 154-156, 158-160, together with inductors 176-180 to boost the voltage of the power supplied thereto from power bus 36 and to deliver the boosted voltage to shared DC voltage bus 38. Controller 172 controls bi-directional DC-to-DC voltage converter 192 to boost a voltage from second energy storage device 206 and to deliver the boosted voltage to DC bus 184. Controller 172 also controls bi-directional DC-to-DC voltage converters 188-190 to buck a voltage from energy storage device 182 and the boosted voltage from second energy storage device 206 and to deliver the boosted current/voltage to shared DC voltage bus 38. DC bus 146 and DC bus 184 may be independently controlled to provide energy to shared DC voltage bus 38. In addition, contactors 186, 208 and bi-directional DC-to-DC voltage converters 188-190 may be independently controlled to convert energy from either energy storage device 182 or second energy storage device 206 for delivery to shared DC voltage bus 38.

Second energy storage device 206 may be charged by closing contactors 204, 208 and by opening contactors 186, 202, 210. In this manner, controller 172 controls respective pairs of half phase modules 150-152, 154-156, 158-160, together with inductors 176-180 to boost the current and/or voltage of the power supplied thereto from power bus 36 and to deliver the boosted voltage to DC bus 184. From DC bus 184, current/voltage is provided to second energy storage device 206 via bucking control of bi-directional DC-to-DC voltage converter 192. In another embodiment of the invention, the charging of energy storage device 182 may be performed during periods of low demand or low cost, for example, for the power on power bus 36. Energy storage device 182 may be used to augment the power provided to shared DC voltage bus 38 via AC-to-DC voltage inverter 144 during periods of high demand or high cost, for example, such as during high temperature days. Controller 172 may open contactors 202, 204, 210 and close contactors 186 208 and control bi-directional DC-to-DC voltage converter 192 to buck energy provided to DC bus 184 from energy storage device 182.

Figure 10:
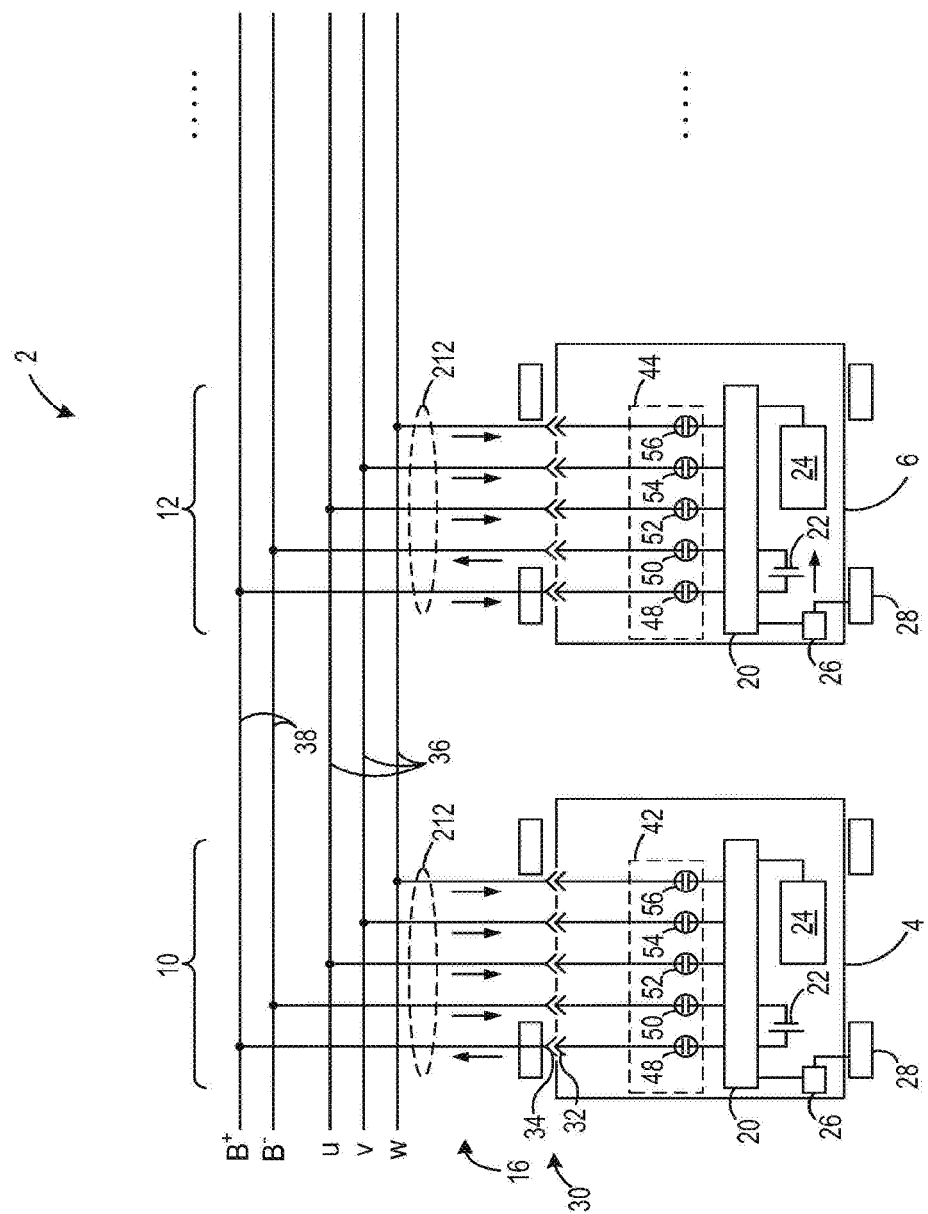
FIG. 10 is a schematic diagram of another a portion of the charging system of FIG. 1 according to an embodiment of the invention.

FIG. 10 is a schematic block diagram of charging system 2 according to another embodiment of the invention. As shown in FIG. 10, contactor groups 42, 44 are positioned on board vehicles 4, 6. According to an embodiment, controllers 24 of vehicles 4, 6 are configured to control contactors 48-56 and to communicate with each other via power line communications over power bus 36 or via other modes of communication as described above. In this manner, charging station 16 only provides connections to power bus 36 and shared DC voltage bus 38 for charging, rapid charging, and sharing power electronics 20 between vehicles 4, 6. Controllers 24 of vehicles 4, 6 are configured to communicate with each other regarding the rapid charging and power electronic sharing therebetween. While only vehicles 4 and 6 are illustrated in FIG. 10, it is contemplated that more than two vehicles could be configured and coupled together in the manner shown.

FIG. 10 also shows an embodiment of connection system 30 coupled to vehicles 4, 6. In this manner, a cord or tether 212 coupled to mating contact 34 and coupling each vehicle 4, 6 to charging station 16 may be extend from and be supplied by the charging station 16 rather than being provided on board vehicles 4, 6 to reduce a cost and/or weight of vehicles 4, 6.

Embodiments of the invention thus use components such as inverters and converters already on-board a traction control system to charge one or more energy storage devices of the traction control system and to provide charging current to other traction control systems in a sharing mode. In this manner, these components may be used for the dual purposes of motoring and recharging the energy storage devices. Using the on-board components of one or more vehicles to rapidly charge the energy storage device of another vehicle allows for off-board charging stations to have a simple, low cost design. In addition, charging may be organized in a cost effective pricing schedule such that charging becomes more cost effective when the choice of sharing the power electronics of the vehicle for other vehicles is selected. Rapid, fast charging of the on-board energy storage devices may be thus accomplished through vehicle power electronics sharing such that off-board charging stations may be constructed and operated in a more cost effective manner than an off-board charging station built to provide high levels of current and power for rapid charging alone.

A technical contribution for the disclosed apparatus is that it provides for a controller implemented technique for rapidly charging one electric drive system using shared power electronics of one or more additional electric drive systems.

According to one embodiment of the invention, an apparatus comprises a power electronic energy conversion system comprising a first energy storage device configured to store DC energy and a first voltage converter configured to convert a stored voltage from the first energy storage device into a first voltage configured to drive an electromechanical device. The first voltage converter is also configured to convert a second voltage from a remote power supply into a first charging voltage configured to charge the first energy storage device. The apparatus also includes a first controller configured to control the first voltage converter to convert the second voltage into the first charging voltage and to provide the first charging voltage to the first energy storage device during a charging mode of operation and communicate with a second controller located remotely from the power electronic energy conversion system to cause a second charging voltage to be provided to the first energy storage device during the charging mode of operation to rapidly charge the first energy storage device.

In accordance with another embodiment of the invention, a method comprises coupling a first energy storage device to a first voltage converter, wherein the first energy storage device is configured to store electrical energy and wherein the first voltage converter is configured to convert a stored voltage from the first energy storage device into a first voltage configured to drive a motor and to convert a second voltage from a first remote power supply into a first charging voltage configured to charge the first energy storage device. The method also comprises coupling a first controller to the first voltage converter and configuring the first controller to cause the first voltage converter to convert the second voltage into the first charging voltage and to provide the first charging voltage to the first energy storage device during a rapid charging mode of operation. The method further comprises configuring the first controller to cause a second charging voltage from a second remote power supply to be provided to the first energy storage device during the rapid charging mode of operation to rapidly charge the first energy storage device.

In accordance with yet another embodiment of the invention, a system comprises a first power bus, a second power bus, and a first vehicle. The first vehicle comprises a first energy storage device configured to store DC energy, a first motor and a first voltage converter configured to convert a stored voltage from the first energy storage device into a motoring voltage configured to drive the first motor and to convert a first voltage from the first power bus into a first charging voltage configured to charge the first energy storage device. The first vehicle also comprises a first controller configured to control the first voltage converter to convert the first voltage into the first charging voltage and to provide the first charging voltage to the first energy storage device. The system also comprises a first energy conversion system located remotely from the first vehicle and comprising a second voltage converter configured to convert the first voltage from the first power bus into a second charging voltage configured to charge the first energy storage device of the first vehicle. The first energy conversion system further comprises a second controller configured to control the second voltage converter to convert the first voltage into the second charging voltage and to provide the second charging voltage to the second power bus and communicate with the first controller to cause the second charging voltage to be provided from the second power bus to the first energy storage device to rapidly charge the first energy storage device.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A vehicle charging system comprising:
an energy storage device;
a connection system coupleable to an external charging source and configured to utilize a DC connection and an AC connection, the connection system configured to:
provide a first input voltage to charge the energy storage device at a first charging rate when the energy storage device is coupled to the DC connection; and
provide a second input voltage to charge the energy storage device at a second charging rate when the energy storage device is coupled to the AC connection;
an AC/DC converter coupleable to the AC connection; and
a plurality of DC converters coupleable to the AC/DC converter and the DC connection, the plurality of DC converters configured to:
boost the first or second input voltage to an intermediate voltage via a first DC converter; and
buck the intermediate voltage to an output voltage via a second DC converter, the output voltage for charging the energy storage device.

2. The vehicle charging system of claim 1, further comprising an electromechanical device coupled to the AC/DC converter.

3. The vehicle charging system of claim 1, wherein the DC and AC connections are each mating contacts.

4. The vehicle charging system of claim 1, wherein the connection system is on-board the vehicle.

5. A vehicle comprising:
a connection system coupleable to an external charging source, the connection system configured to utilize a DC connection and an AC connection;
an AC/DC converter coupleable to the AC connection;
a plurality of DC converters coupleable to the AC/DC converter, the plurality of DC converters configured to operate in combination to step up and step down an input voltage derived from the AC connection;
an energy storage device coupleable to:
at least one of the plurality of DC converters; and
the DC connection; and
a controller programmed to:
charge the energy storage device at a first charging rate when the energy storage device is coupled to the DC connection;
charge the energy storage device at a second charging rate when the energy storage device is coupled to the AC connection; and
operate the plurality of DC converters when charging the energy storage device via the AC connection by:
operating a first DC converter to boost the input voltage to an intermediate voltage; and
operating a second DC converter to buck the intermediate voltage to an output voltage to charge the energy storage device.

6. The vehicle of claim 5, further comprising an AC motor coupled to the AC/DC converter.

7. The vehicle of claim 5, wherein the DC and AC connections are each mating contacts.

8. The vehicle of claim 5, wherein the vehicle is a plug-in hybrid electric vehicle.

9. A method for charging an energy storage device on-board a vehicle, the vehicle including a connection system coupleable to an external charging source and a plurality of voltage converters, the method comprising:
providing a first input voltage to charge the energy storage device at a first charging rate if the energy storage device is coupled to a DC connection of the connection system;
providing a second input voltage to charge the energy storage device at a second charging rate if the energy storage device is coupled to an AC connection of the connection system;
rectifying the second input voltage via an AC/DC converter of the plurality of voltage converters;
boosting the first input voltage or rectified second input voltage to an intermediate voltage via a first DC converter of the plurality of voltage converters; and
bucking the intermediate voltage to an output voltage via a second DC converter of the plurality of voltage converters, the output voltage to charge the energy storage device.

10. The method of claim 9, further comprising decoupling an electromechanical device from the energy storage device.

11. The method of claim 9, wherein the DC and AC connections are each mating contacts.

12. The method of claim 9, wherein the vehicle is a plug-in hybrid electric vehicle.

13. The vehicle charging system of claim 1, wherein the AC/DC converter is bi-directional.

14. The vehicle charging system of claim 13, wherein the AC/DC converter is further configured to supply AC voltage to an electromechanical device.

15. The vehicle charging system of claim 1, further comprising an additional energy storage device coupled to the AC/DC converter.

16. The vehicle charging system of claim 15, wherein one energy storage device is a high-specific power energy storage device and the other energy storage device is a high-specific energy energy storage device.

* * * * *